(12) United States Patent
O'Donnell et al.

(10) Patent No.: US 6,480,877 B1
(45) Date of Patent: Nov. 12, 2002

(54) ORPHAN COMPUTER PROCESS IDENTIFICATION

(75) Inventors: Michael D. O'Donnell, Austin, TX (US); Danny B. Gross, Austin, TX (US); Gene R. Toomey, Kyle, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/146,405

(22) Filed: Sep. 2, 1998

(51) Int. Cl.[7] ................................................ G06F 9/00
(52) U.S. Cl. ........................................................ 709/100
(58) Field of Search ...................... 714/15; 709/100–108

(56) References Cited

U.S. PATENT DOCUMENTS 5,544,316 A * 8/1996 Carpenter et al. .......... 709/310
5,938,775 A * 8/1999 Damani ET AL. ............ 714/15

OTHER PUBLICATIONS

W. Richard Stevens, "Advanced Programming in the UNIX Environment", 1992, Addison–Wesley Publishing Company, Brian W. Kernighan, Consulting Editor, pp. 256–258.*

Barbara Liskov, "Orphan Detection", 1987, 17th International Symposium on Fault–Tolerant Computing., IEEE, pp. 2–7.*

Ahmed K. Ezzat, "Orphan Elimination in Distributed Object–Oriented System", 1990, IEEE, pp. 403–412.*

Maurice P. Herlihy, "Timestamp–Based Orphan Elimination", Jul. 1989, Transactions on Software Engineering, vol. 15. No. 7, pp. 825–832.*

Consilium, WorkStream DFS/A Brochure, Feb., 1993 (6 pages).

"Semiconductor Automation and the Role of WorkStream DFS/A," Consilium publication, Sep. 1993 (14 pages).

Quick Start Semiconductor Automation Program Description, Consilium, ITP Systems (date unknown) (2 pages).

* cited by examiner

Primary Examiner—St. John Courtenay, III
(74) Attorney, Agent, or Firm—Hamilton & Terrile, LLP; Stephen A. Terrile

(57) ABSTRACT

Minimization of waste of information processing resources by orphan computer processes in an information processing system is provided by: assembling information regarding active computer processes on a computer system; classifying each of the active computer processes for which information was assembled as one of a group consisting of legitimate computer processes and orphan computer processes; and processing the orphan computer processes according to an orphan processing protocol.

36 Claims, 4 Drawing Sheets

ORPHAN COMPUTER PROCESS IDENTIFICATION

BACKGROUND

1. Field of the Invention

The present invention relates to computer systems and processes running on computer systems, and, more particularly, to identification of orphan computer processes on computer systems.

2. Description of the Related Art

Computer systems are information processing systems which can be designed to give independent computing power to one user or a plurality of users. Computer systems may be found in many forms including, for example, mainframes, minicomputers, workstations, servers, personal computers, and embedded systems. A typical computer system includes at least one processing unit, associated memory and a number of input/output (I/O) devices. In addition to other purposes, computer systems are used to track and control manufacturing processes such as semiconductor manufacturing processes and systems.

A computer system processes information according to a program and produces resultant output information via the I/O devices. A program is a list of internally stored instructions such as a particular application program and/or an operating system. A computer process typically includes an executing (running) program or portion of a program, current program values and state information, and the resources used by the operating system to manage the execution of the process. A process may spawn other processes. A process which spawns other processes is a parent process, and the spawned processes are child processes of the parent process. A function described as being performed by a parent process is sometimes actually performed by a child process spawned by the parent process to perform the function. An application or work session includes an application/work process and any processes spawned by the application/work process.

A computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing are called multiprocessing systems. Active processes are often referred to as executing concurrently when such processes are executed in a multitasking and/or a multiprocessing environment.

Computer systems are often coupled to other computer systems to form a network to facilitate the exchange and handling of information. A computer network typically includes a group of computer systems and associated hardware devices (e.g., physical connections) and software applications (e.g., communications protocol programs and data). A computer network may include multiple computer processes executing on several computer systems as a distributed multiprocessing platform in which the several computer systems are accessible by each of the computer processes. A local computer system coupled to a remote computer system or a network of remote computer systems may include multiple computer processes initiated by one or more local users and/or remote users. Additionally, multiple computer processes executing on the same computer system often communicate with each other in a similar fashion as multiple computer processes executing on different computer systems. Consequently, it often makes sense to discuss interaction between computer processes instead of, or in addition to, interaction between computer systems.

Orphan computer processes are computer processes that are active or otherwise consume system resources on a computer system but that have no user that owns the process. Computer processes become orphan computer processes because of any of a number of events and circumstances. For example, a remote user can terminate a network connection without properly terminating any computer processes activated during the remote user session. When the remote user disconnects without terminating the remotely executed computer processes, the remotely executed computer processes continue to run on the local computer system. Such orphan computer processes become parasitic processes in that they use valuable computer system resources without providing a corresponding benefit to any computer system user, whether remote or local. For example, orphan computer processes can consume memory, database connections, process slots and processor cycles. Consequently, orphan computer processes can slow the performance of other, legitimate computer processes which provide benefits to users. Orphan computer processes can even prevent legitimate computer processes from executing.

SUMMARY

It has been discovered that orphan computer processes may be automatically identified or otherwise distinguished from legitimate computer processes by a method including user initiated processes or by a software module executed by or on a computer system. Such a method or module allows the automatic termination of orphan processes and the release of computer system resources for other, legitimate computer processes. Such a method or module allows the automatic identification of orphan computer processes for analysis of use of system resources by system managers. The operation of computer systems and/or computer networks is thereby improved according to the invention. Such a method or module especially provides the advantage of freeing computer resources for use by other processes in a distributed computing system such as a semiconductor processing system.

In one embodiment of the present invention, a method of minimizing waste of information processing resources by orphan computer processes in an information processing system is provided. The method includes the following: assembling information regarding active computer processes on a computer system; classifying each of the active computer processes for which information was assembled as one of a group consisting of legitimate computer processes and orphan computer processes; and processing the orphan computer processes according to an orphan processing protocol.

In another embodiment, a method of orphan computer process identification is provided. The method includes generating process identification information regarding each of a plurality of computer processes operating on an information processing system and determining from the process identification information which of the computer processes are orphan computer processes.

In another embodiment, an apparatus includes a computer-readable storage medium. The apparatus further includes an orphan identification module stored on the computer-readable storage medium. The orphan identification module is configured to identify orphan computer processes running on a target computer system responsive to being executed on a computer system.

BRIEF DESCRIPTION OF THE DRAWINGS

The present invention may be better understood and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of certain embodiment(s) of the invention and should not be taken to be limiting to the invention itself. Rather, many variations, modifications, additions, and improvements may fall within the scope of the invention which is defined in the claims which follow the description.

Figure 1:
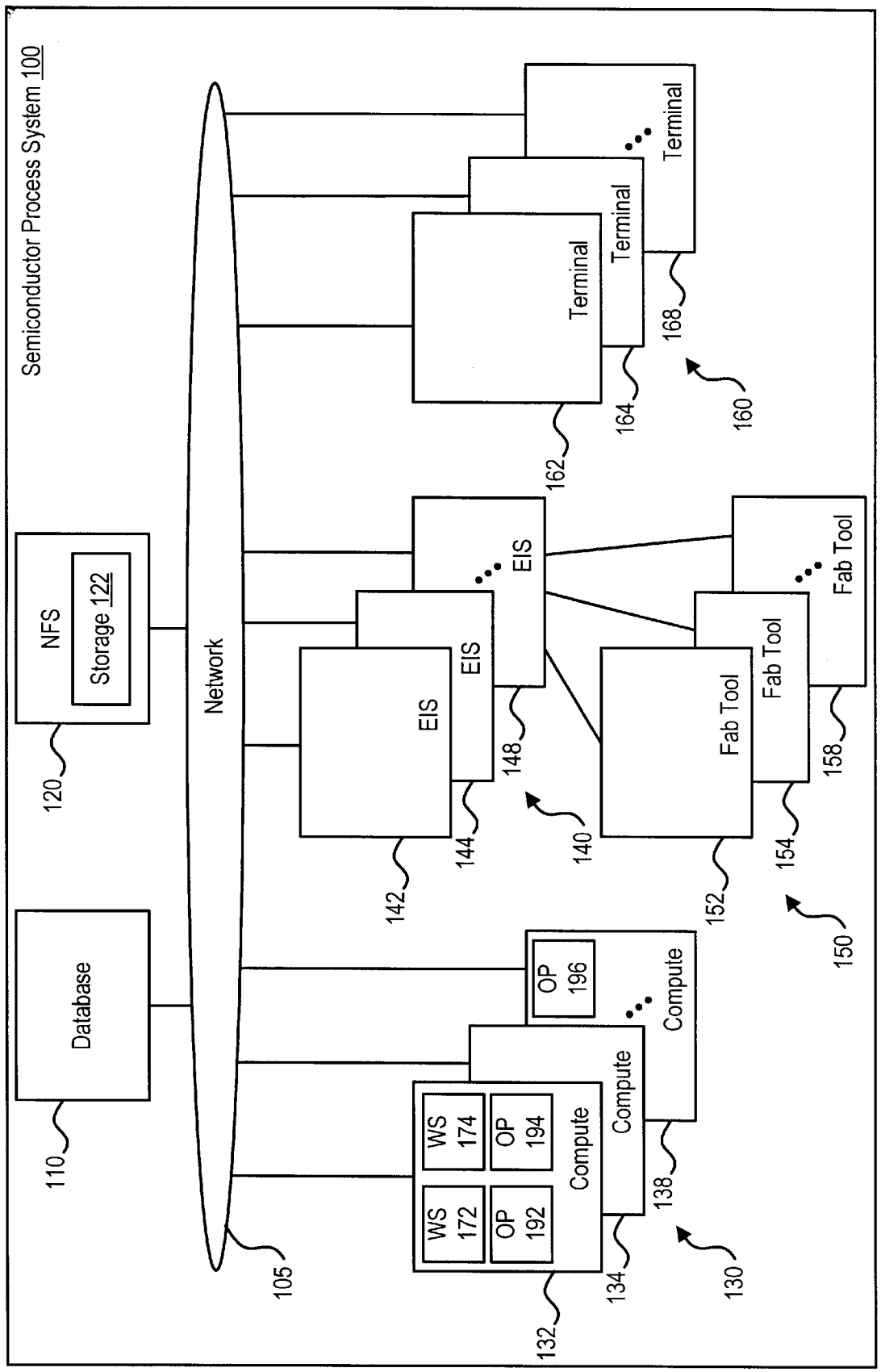
FIG. 1 shows a block diagram of one embodiment of an exemplary distributed computing system in accordance with the invention.

Referring to FIG. 1, a distributed computing system such as semiconductor processing system 100 includes a network 105 coupled to various computer systems such as database server 110, network file server (NFS) 120, compute servers 130, equipment interface servers 140, and terminals 150. Network 105 may be an Ethernet coupling, a fiber distributed data interface (FDDI) coupling, or any other expedient for coupling the computer systems of semiconductor processing system 100. Compute servers 130 include at least one compute server such as compute servers 132, 134 and 138. Equipment interface servers 140 include at least one equipment interface server (EIS) such as EIS 142, EIS 144 and EIS 148. Terminals 160 include at least one terminal such as terminals 162, 164 and 168. Semiconductor processing system 100 further includes fab tools coupled to equipment interface servers 140. For example, fab tools 150 are coupled to EIS 148 via any appropriate coupling such as a network, RS-232 standard connection, or any other appropriate coupling or couplings. Fab tools 150 include at least one terminal such as terminals 152, 154 and 158 coupled to EIS 148.

Database server 110 typically has high availability requirements and is accessible by multiple remote users of computer systems coupled within semiconductor processing system 100. Computer systems such as database server 110 are often used to facilitate general manufacturing monitoring and control. For example, database server 110 provides information regarding semiconductor manufacturing tools (e.g., fab tools 150) and facilitates control and/or automation of semiconductor manufacturing tools and/or systems by users in a semiconductor manufacturing facility or fab.

Semiconductor processing system 100 includes computer systems coupled to execute various subtasks of semiconductor processing system 100. For example, compute servers 130 include, work sessions 172 and 174 for controlling the operation of one or more of fab tools 150. In operation, a terminal user initiates a semiconductor application work session on one of compute servers 130 from one of terminals 160. Each work session accesses a semiconductor processing database on database server 110 to read and write information regarding the operation of fab tools 150. Each work session provides control information to fabtools 150 via equipment interface servers 140 and returns status information to database server 110. For example, a user of terminal 162 initiates work session 172 on compute server 132 to control fab tool 152 and to receive and provide information regarding the operation of fab tool 152.

During the course of normal operation, compute servers 130 often become host to a number of orphan computer processes. For example, compute server 132 includes orphan processes 192 and 194, and compute server 138 includes orphan process 196. Such orphan processes serve no purpose in completion of the many subtasks of semiconductor processing system 100, and serve only to slow the operation of compute servers 132, 138, thereby incrementally slowing the completion of the various subtasks of semiconductor processing system 100.

In the presently described embodiment, computer systems 110, 120, 130 and 160 operate under control of a UNIX type operating system. For example, compute servers 130 are Hewlett Packard Series 800 computer system running the HP-UX 9.04 type UNIX operating system. Such a computer system may function as a server for client computer systems. Terminals 160 are Xterminals and/or personal computer systems executing software such as Xwindows of PCNFS for managing sessions. It is understood that other computer systems, other UNIX operating systems (e.g., the. International Business Machines AIX operating system), and other operating systems may be used in accordance with the invention. Other embodiments may include mainframes, minicomputers, personal computer systems and/or terminals in place of some or all of the computer systems of semiconductor processing system 100. Files are accessed by the computer systems of semiconductor processing system 100 using the network file server (NFS) protocol. Other appropriate methods of making the files available to computer systems 110, 130, 140 and 160 may be used in accordance with the invention.

Also, in the presently described embodiment, semiconductor processing system 100 provides a semiconductor manufacturing and processing management system for managing information distribution, system control and automation of manufacturing processes in a semiconductor fabrication facility. Semiconductor. processing system 100 operates using a WorkStream Distributed Factory System (WorkStream DFS), WorkStream DFS/A™ or other variants (hereinafter, WorkStream) which are available from Consilium, Inc. of Mountain View, Calif. WorkStream is a factory shop floor application that drives the manufacturing functions within a semiconductor manufacturing facility or fab. WorkStream manages the execution of production plans for manufacturing operations by providing control of work instructions to users and by providing control of automated equipment. WorkStream also records product genealogies and work conditions. WorkStream users initiate WorkStream work sessions on compute servers 130 from terminals 160. Each WorkStream work session accesses database server 110 to read and write information to database 150 regarding the operation of fab tools 150. Each WorkStream work session provides control information to fab tools 150 via equipment interface servers 140 and returns status information to database server 110.

WorkStream DFS is typically implemented via a single server. However, when a large number of instances of WorkStream applications are implemented over multiple server systems, communication between the system managers and work session users becomes complicated, and the likelihood of orphan computer processes existing within the system or network increases. As the number of instances of work sessions increases and the locations of work sessions become more distributed, the situation becomes exacerbated. For example, if ten or more compute servers 130 are used to support 1000 or more work sessions over a distributed computer network in a semiconductor fabrication facility, the number of possible orphan computer processes and the resulting drain on computer system resources are potentially very high. More than 100 WorkStream work sessions may be executing on each of the compute servers 130 from the terminals 160 coupled thereto. In such an environment, orphan process identification and termination becomes especially difficult.

Figure 2:
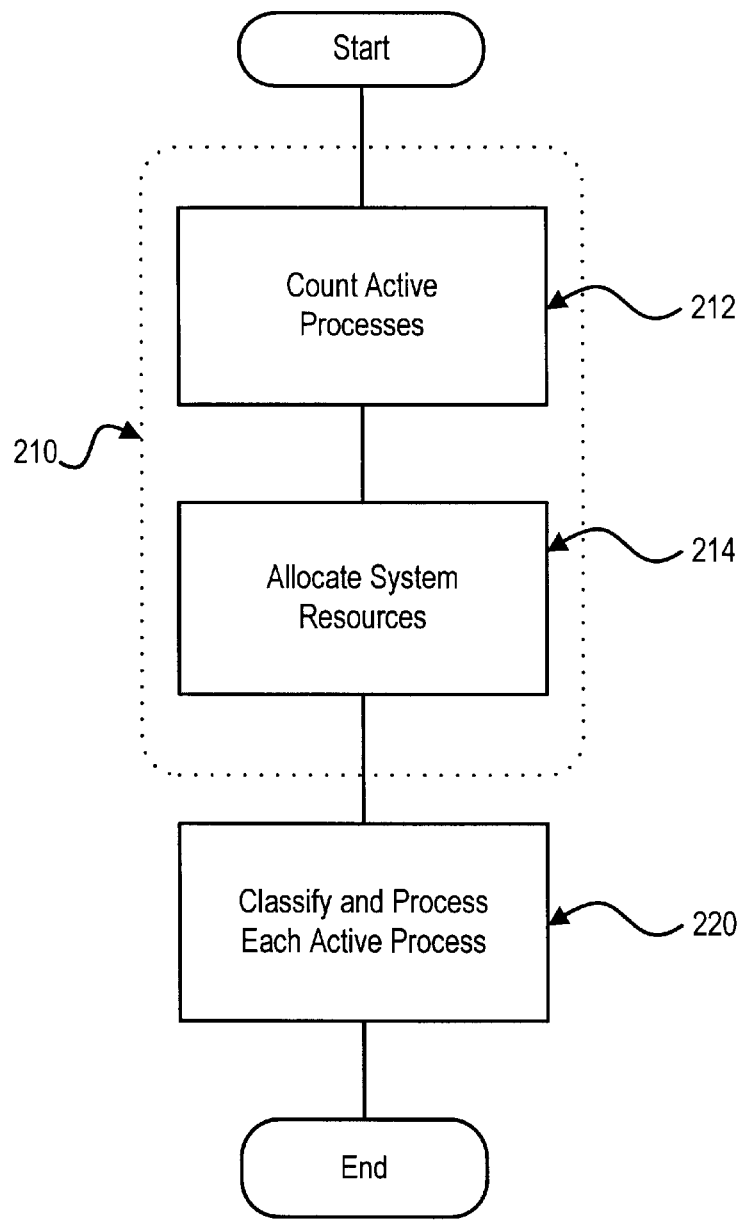
FIG. 2 shows a flow chart of one embodiment of orphan identification and processing in accordance with the invention.
Figure 3:
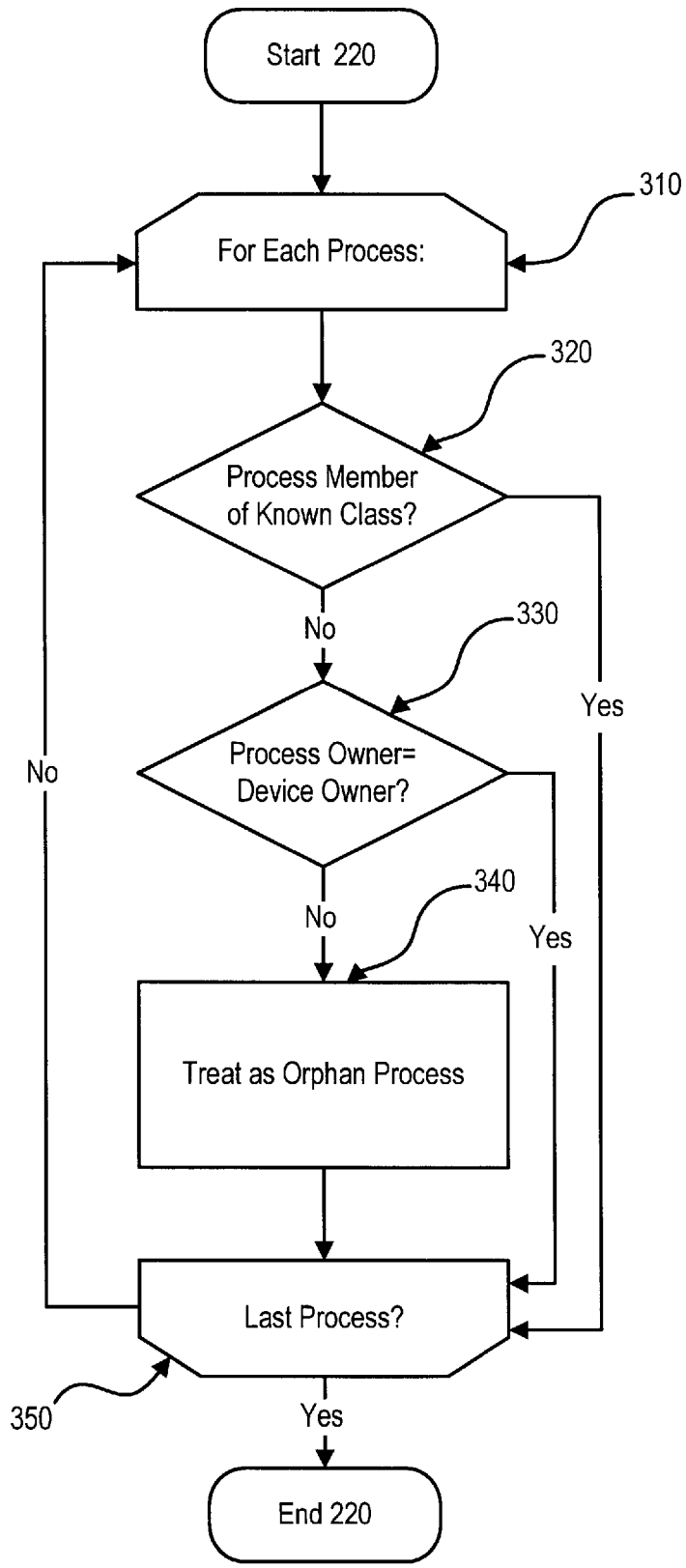
FIG. 3 shows a flow chart of one embodiment of orphan identification in accordance with the invention.
Figure 4:
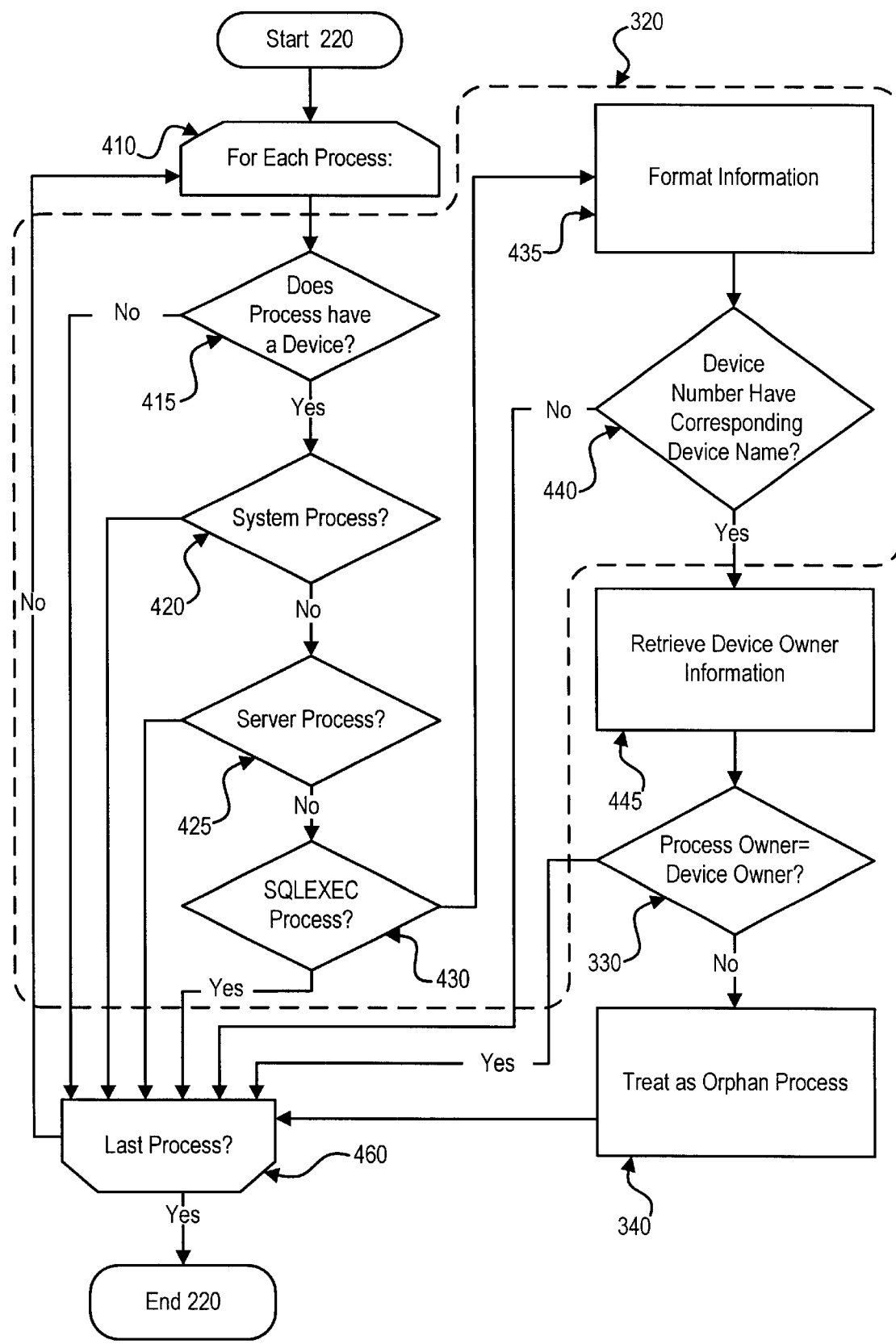
FIG. 4 shows a flow chart of one embodiment of orphan identification in accordance with the invention.

FIGS. 2–4 are flow charts showing various operations of an orphan identification method and portions thereof in accordance with the invention. Such a method is also presented in the following exemplary C programming language program which provides an orphan identification and processing module for identifying orphan computer processes and printing information regarding the identified orphan computer processes in accordance with the invention. The orphan identification method is further described hereinafter, and sometimes with reference to the following exemplary program and/or module.

```
#include <sys/pstat.h>
#include <stdlib.h>
#include <sys/stat.h>
#include <devnm.h>
#include <pwd.h>
/*
** Function: index
** Purpose: find a substring within a string
** Return: return -1 if substring not found, otherwise returns index where substring begin
*/
int index(s,t)
char s[ ], t[ ];
{
    int i, j, k;
    for (i=0; s[i] !='\0'; i++) {
        for (j=i, k=0; t[k] !='\0' && s[j]==t[k]; j++, k++)
            ;
        if (t[k]=='\0')
            return(i);
    }
    return(-1);
}
/*
** Function: exclude
** Purpose: routine to exclude certain processes from consideration. In our environment,
**         we want to throw away all processes that didn't have a tty connection, all system processes
**         and all sqlexec processes.
** Return: return 1 if the process is to be excluded, otherwise return 0 to have process
**         considered for termination
*/
int exclude(proc)
struct pst_status *proc;
{
    if(proc->pst_term.psd_major == -1)
        return(1); /* exclude all processes that don't have a tty */
    if(proc->pst_uid < 10)
        return(1); /* exclude all system processes */
    switch (proc->pst_uid)
    {
        case 810:    /* exclude processes owned by wsRmt */
        case 1002:   /* exclude processes owned by eiadmin */
            return(1);
            break;
        default:
            break;
    }
    if (index(proc->pst_cmd,"sqlexec")>=0)
        return(1); /* exclude all sqlexec processes */
    return(0);
}
process(proc)
struct pst_status *proc;
{
    struct stat st;
    struct passwd *pw;
    int r;
    dev_t devnum;
    char devname[256];
```

-continued

```
        r=exclude(proc);
        if(r !=0)
            return;
        devnum = (dev_t)((proc->pst_term.psd_major<<24)|proc->pst_term.psd_minor);
            r=devnm(S_IFCHR, devnum, &devname[0], 256, 1);
            if(r != 0)
                return;
            else
                stat(devname,&st);
        if (st.st_uid == proc->pst_uid)
            return;
        pw = getpwuid(proc->pst_uid);
        printf("pid=%d ",proc->pst_pid);
        printf("uid=%d ",proc->pst_uid);
        printf("name=%s ",pw->pw_name);
        printf("maj=%d min=%d ",proc->pst_term.psd_major),
            proc->pst_term.psd_minor);
        printf("devname=%s ",devname);
        printf("cmd=%s\n",proc->pst_cmd);
}
main( )
{
    struct pst_dynamic pd;
    struct pst_status *ps;
    int nproc, i;
    pstat_getdynamic( &pd, sizeof(struct pst_dynamic), 1, 0);
    nproc=pd.psd_activeprocs;
    ps = (struct pst_status *)(malloc(sizeof(struct pst_status) * nproc));
    pstat_getproc(ps,sizeof(struct pst_status),nproc,0);
    for (i=0; i<nproc; i++)
        process(ps[i]);
}
```

Generally, the above program executes a main module in which information is gathered regarding active processes. Within the main module, a function entitled "process" is executed for each active process. The process function executes a function entitled "exclude" which skips the current process if it is in a class or is otherwise identified as a process that is not an orphan. If a non-zero value is returned by the exclude function, the current process is not an orphan and the current iteration of the process function is exited so that the next active process may be checked. Next, if the current process is not excluded, device ownership information of the current process is formatted and analyzed. If the current process has no device information, then the corresponding process is a UNIX daemon process which is not considered to be an orphan and the current iteration of the process function is exited so that the next active process may be checked. Further, if the owner of the current process matches the owner of the corresponding device, then the corresponding process is not an orphan and the current iteration of the process function is exited so that the next active process may be checked. If the current iteration of the process function is not exited, then the current process is treated as an orphan. For example, information regarding the process is printed to a file or device for subsequent analysis.

FIG. 2 shows an orphan identification method according to the invention. The orphan identification method includes a preparation operation 210 and a classification and process operation 220. In the embodiment shown, preparation operation 210 includes count active processes operation 212 and allocate system resources operation 214. Other embodiments may include other preparation operations that collect information about all active processes.

Count active processes operation 212 executes on a computer system to count the number of active processes on the same computer system, another computer system or a network of computer systems. Referring to FIGS. 1 and 2, count active processes operation 212 executes on one of the computer systems of semiconductor, processing system 100 to count the number of active processes on one, some or all of compute servers 130. In one embodiment, the following software commands of the C programming language are used to determine the number of active processes:

```
    struct pst_dynamic pd;          /* declares variable pd of structure type
pst_dynamic */
    int nproc;                      /* declares integer variable nproc */
    pstat_getdynamic( &pd, sizeof(struct pst_dynamic), 1,0);
    nproc=pd.psd_activeprocs;       /* returns the number of active processes */
```

The first two lines declare the variables pst_dynamic and nproc. The next two lines provide perform fimctions regarding the declared variables.

In the above exemplary code, the keyword struct declares a variable pd of the structure type pst_dynamic. In the above example, a structure named pst_dynamic is a previously declared or included structure (e.g., in an included source or header file). An exemplary header file is included in Appendix A of the present disclosure. The structure pst_dynamic includes elements or fields for storing dynamic computer system and/or network variables which may change frequently during normal operation. For example, the structure pst_dynamic includes a field for storing status information such as the number of active processes and the number of active files/devices. Other status information is included such as the number of processors, the number of paused processes, amount and types of memory available and unavailable, open logical volumes and volume groups, etc.

The pstat_getdynamic system call is a Hewlett-Packard-specific system call. The parameter &pd points to an instance of the pst_dynamic structure to which the system call pstat_getdynamic returns data. The parameter size of (struct pst_dynamic) returns the size of the pst_dynamic structure. The last two parameters are 1 and 0. The 1 is the number of structures requested to be filled. For example, although pd is a single structure, an array. of structures could be used. Because a single structure is used in the presently described embodiment, 1 is the only valid value for this parameter. Other embodiments may use other values as appropriate. The parameter 0 provides an index for the starting data element. The system call pstat_getdynamic() returns dynamic information about the system stored in pst_dynamic. The keyword int declares an integer nproc. The variable nproc is defined to be the number of active user processes running on the system. Specifically, the variable nproc is assigned the value of the member psd_activeprocs of structure pd.

After count active processes operation 212 and during allocate system resources operation 214, memory sufficient to store a list of active processes is allocated. In one embodiment, allocate system resources operation 214 further allocates memory sufficient to store information regarding each of the active processes in the list. For example, allocate system resources operation 214 allocates memory accessible by computer system 110 to store a list of active system 100 processes and information regarding the active processes.

In one embodiment, one block of memory is required to hold the information about each active process on the system. Therefore, memory is allocated for the amount of space of a block times the number of processes on the system. For example, the following software commands are used to allocate an array to store information regarding each active process:

```
struct pst_status *ps;       /* declares pointer ps to a structure type pst_status */
ps = (struct pst_status *)(malloc(sizeof(struct pst_status) * nproc));
pstat_getproc(ps,sizeof(struct pst_status),nproc,0);
```

In the above exemplary code, the keyword struct declares a pointer pd to the structure type pst_status. The structure named pst_status is a previously declared or included structure (e.g., in an included source or header file). An exemplary header file is included in appendix A. The structure pst_status includes elements or fields for storing information regarding each process executing on the computer system and/network. For example, the structure pst_status includes a field for storing status information such as the process ID, parent process ID, process device, address of process in memory, flags associated with process, current process status, just to name a few.

The structure pointer ps is assigned a value of an address of the allocated memory. For example, sizeof (struct pst_ status) returns the number of bytes of the structure pst_ status. The system call malloc() allocates for use a memory area having a size equal to the number of bytes returned by sizeof (struct pst_status) times the number of active processes represented by the variable nproc. Thus, if 10 bytes are required for pst_status, and if there are 10 active processes, 100 bytes are allocated and pointed to by ps. The 100 bytes of memory are enough to hold information about the 10 active processes. The cast (struct pst_status *) tells the compiler that even though malloc() returns a pointer to an array of bytes, the pointer is actually regarded as a pointer to a structure, or in this case, an array of structures. The above code sets ps to point to the address of the allocated memory.

The system call pstat_getproc() in the above exemplary code is a Hewlett-Packard-specific system call which returns information specific to a particular process. There is one instance of this system call for each active process on the system. For each instance, data is returned in a (struct pst_status) structure. The first parameter ps is the block of memory to which the system call pstat_getproc() returns data. The parameter sizeof(struct pst_status) returns the size of the structure type-specifier pst_status of the structure which is being written. The third and fourth parameters are nproc (the number of active processes) and 0, respectively. To get information about every process on the system, the third parameter is set to the number of processes on the system, and the fourth parameter is set to 0. To get information about a single process, the third parameter is set to 0, and the fourth parameter is set to the process identification (PID) of the relevant process.

After allocate system resources operation 214 and during classification and process operation 220, information regarding each of the active processes on a computer system is retrieved. Each active process is processed accordingly. Generally, each process is checked to determine if it is a member of a class that is known not to be an orphan. If the process is a member of such a class, it is excluded from the list of processes so that it is not considered for treatment as an orphan process. For example, if the process is a system or server process, the process is not an orphan process and may be eliminated from the list of processes being considered for classification as orphan processes. Each of the remaining processes is checked to determine if the device owner of the process matches the process owner. If so, the process is not an orphan process and is excluded. If the process device owner and the process owner do not match, then the process may be an orphan process and is not excluded.

The processes that remain on the list of processes are subject to treatment as an orphan process. Such treatment includes processing the orphan processes according to an orphan processing protocol. One exemplary orphan processing protocol includes providing output data including information identifying such processes for analysis by a computer program and/or a computer system user. For example, the output data may include of list of process identifiers and information describing each orphan process so that computer system managers may make decisions regarding the orphan processes. Another exemplary orphan processing protocol includes terminating each orphan process. Other orphan processing protocols include a combination the above two exemplary orphan processing protocols.

FIG. 3 shows a flow chart of an embodiment of classifying and processing computer processes according to the invention. Loop 310–350 begins execution at begin loop operation 310. In one embodiment, a C language "for" loop is executed to begin loop operation 310. Loop 310–350 ends execution at end loop decision 350 if the loop exit conditions are satisfied (e.g., the last process has been processed by the loop). Each iteration of loop 310–350 analyzes a respective process counted during count active processes operation 212. Other embodiments may use other types of loops or analyze each process in a different manner.

After begin loop operation 310 and during class decision operation 320, the process of the current loop iteration is checked to determine if it is a member of a known class of non-orphan programs. If so, control transitions from class decision operation 320 to end loop decision operation 350. If the current process is not a member of such a class, control transitions from class decision operation 320 to ownership decision operation 330. During ownership decision operation 330, the current process is checked to determine if the process device owner matches the process owner. If the device owner matches the process owner, the process is not an orphan, and control transitions from ownership decision operation 330 to end loop decision 350. If the device owner does not match the process owner, then the process is an orphan process, and control transitions from ownership decision operation 330 to process orphan operation 340.

During process orphan operation 340, the current process is treated as an orphan computer process. In one embodiment, the current process is terminated. For example, the following software command is used to terminate the current orphan process:

kill (proc->pst_uid);

In another embodiment, information regarding the current process is output to a display or file for analysis by a computer system manager or user. For example, the following software commands are used to output information regarding the current. orphan process:

printf("pid=%d",proc->pst_pid);

printf("uid=%d",proc->pst_uid);

printf("name=%s",pw->pw_name);

printf("maj=%d min-%d",proc->pst_term.psd_major, proc->pst_term.psd_minor);

During end loop decision 350, the loop conditions are checked to determine if the loop should be exited. For example, if the current process is the last active process, the loop is exited. If the current process is not the last active process, then control transitions from end loop decision 350 to begin loop operation 310 to begin processing the next active computer process.

FIG. 4 shows a flow chart for an embodiment of classifying and processing computer processes according to the invention. Loop 410–460 begins execution at begin loop operation 410. Loop 410–460 ends execution at end loop decision 460 if the loop exit conditions are satisfied (e.g., the last process has been processed by the loop). Each iteration of loop 410–460 analyzes a respective process counted during count active processes operation 212.

After begin loop operation 410 and during device decision operation 415, the orphan identification module determines if the process of the current loop iteration has a corresponding device. If the process does not have a device or tty (teletypewriter), then the process is not an orphan process. For example, the following software commands are used to determine if the current process has a corresponding device:

if (proc->pst_term.psd_major==-1)

return(1); /* exclude all processes that don't have a tty */

In the above exemplary code, if the major number for the process returns as -1, then there is no device number corresponding to the current process, in which case the current loop iteration is ended (e.g., control transitions to end loop decision 460) and no action is taken regarding the process of the current loop iteration. If a valid device number is returned by the above exemplary code, further analysis is required to determine whether the process is an orphan process. Thus, if the current process does not have a corresponding device, it is not an orphan process, and control transitions from device decision operation 415 to end loop decision 460. If the current process has a corresponding device, then it may be an orphan process, and control transitions from device decision operation 415 to system decision operation 420 for further analysis.

After device decision operation 415 and during system decision operation 420, the orphan identification module determines if the current proces is a system process. For example, the following software commands are used to determine if the current process is a system process:

if (proc->pst_uid<10)

return(1); /* exclude all system processes */

In the above exemplary code, if the process identifier (pst_uid) is less than 10, the process is a system process, in which case the current loop iteration is ended and no action is taken regarding the process of the current loop iteration. If the process identifier is greater than or equal 10, further analysis is required to determine whether the process is an orphan process. Thus, if the current process is a system process, it is not an orphan process, and control transitions from system decision operation 420 to end loop decision 460. If the current process is not a system process, then it may be an orphan process, and control transitions from system decision operation 420 to server decision operation 425 for further analysis.

During server decision operation 425, the orphan identification module determines if the current process is a server process. For example, the following software commands are used to determine if the current process is a server process:

```
switch (proc->pst_uid)
{
    case 810: /* exclude processes owned by wsRmt */
    case 1002: /* exclude processes owned by eiadmin */
        return(1);
        break;
    default:
        break;
}
```

In the above exemplary code, if the process identifier (pst_uid) is 810 or 1002, then the process is a server process. Examples of system server processes may include NFS server processes nfsd and biod, UNIX swap daemon processes swapper and init, and NIS client daemon ypbind. Examples ofuser defined server processes may include an informix server process oninit and a WorkStream DFS remote process DFS_rmt. If the process is a server process, the current loop iteration is ended and no action is taken regarding the process of the current loop iteration. Otherwise, further analysis is required to determine whether the process is an orphan process. Thus, if the current process is a server process, it is not an orphan process, and control transitions from server decision operation 425 to end loop decision 460. If the current process is not a server process, then it may be an orphan process, and control transitions from server decision operation 425 to database decision operation 430 for further analysis.

After server decision operation 425 and during database decision operation 430, the orphan identification module determines if the current process is a database process. For example, the following software commands used to determine if the current process is a database process:

```
if (index(proc->pst_cmd,"sqlexec")>=0)
    return(1); /* exclude all sqlexec processes */
```
In the above exemplary code, if the process command includes the string "sqlexec", the process is a database process. (An example of an index system call which searches for the string "sqlexec" is provided in the earlier quoted C program.) If the process is a database process, the current loop iteration is ended and no action is taken regarding the process of the current loop iteration. If the process command does not include the string "sqlexec", further analysis is required to determine whether the process is an orphan process. Thus, if the current process is a database process, it is not an orphan process, and control transitions from database decision operation 430 to end loop decision 460. If the current process is not a system process, then it may be an orphan process, and control transitions from database decision operation 430 to format information operation 435.

After database decision operation 430 and during format information operation 435, information regarding the process of the current loop iteration is formatted for subsequent analysis. For example, the following software command is used to formulate a device number of the current process:

$$devnum = (dev\_t)((proc \rightarrow pst\_term \cdot psd\_major \ll 24) |$$

$$proc \rightarrow pst\_term \cdot psd\_minor);$$

In the above exemplary code, a device number devnum having a structure type of dev_t (in this case, an integer) is composed by concatenating the device major number (class) and the minor number (instance) of the current process. Specifically, the device number is equal to the major number shifted left 24 bits and OR'd with the 24-bit minor number.

Once the device number devnum has been formulated, the following system call performs a look-up operation to retrieve device name information corresponding to the device number:

```
r=devnm(S_IFCHR, devnum, &devname[0], 256, 1);
```
The system call devnm receives the device number devnum and returns the corresponding device name to the string variable devname. The system call devnm returns a zero to return value r if successful and returns a non-zero value to return value r if unsuccessful (i.e., device name information unavailable). The parameter S_IFCHR requests information about the type of device, in this case, a character special device. The parameter devnum is the above described UNIX device ID which encodes both the major and minor IDs into a single integer value. The parameter devname is the memory location where the system call devnm() will write the name of the device if the system call devnm() was successful. The parameter 256 provides the size in bytes of the string devname. The parameter 1 is a cache flag that tells the system call devnm() whether to save device information in the allocated memory. Control then transitions from format information operation 435 to device number decision operation 440.

After format information operation 435 and during device number decision operation 440, the orphan identification module determines if a device number of the current process is returned. For example, the following software commands are used to determine if the devnm system call completed successfully:

if $(r != 0)$ return;

In the above exemplary code, if the devnm system call did not complete successfully (i.e., returned a non-zero value to the variable r due to unavailable device information), the current loop iteration is ended because the process is not an orphan process and no action is taken regarding the process of the current loop iteration. UNIX daemon processes are thereby excluded from consideration as orphans because such processes typically close all device files by convention when such processes start, and therefore such processes do not have an associated device. If the devnm system call completed successfully and returns the device name to the string variable devname, the process of the current loop iteration may be an orphan process and control transitions from device number decision operation 440 to retrieve information operation 445.

After device number decision operation 440 and during retrieve information operation 445, the orphan identification module retrieves information about the owner of the device of the current process. For example, the following software commands are used to obtain information regarding the named file:

stat(devname,&st);

In the above exemplary code, the system call stat() received the string variable devname which was defined in format information operation 435 and the pointer &st which provides the address of the stat structure st into which information is stored concerning the device. The system call stat() returns information about the file such as file size, ownership, permissions, etc. The system call stat () returns zero upon success, and −1 upon failure. Control then transitions from retrieve information operation 445 to ownership decision operation 330.

After retrieve information operation 445 and during ownership decision operation 330, the orphan identification module compares the process owner with the device owner. For example, the following software commands are used to determine if the current process owner is the same as the device owner of the current process:

if $(st \cdot st\_uid == proc \rightarrow pst\_uid)$ return;

In the above exemplary code, the device owner is compared to the process owner. More specifically, the device user identification stored in the stat structure st is compared to the process user identification pointed to by the current process variable proc. If the process user identification (i.e., the process owner proc->pst_uid) matches the device user identification (i.e., the device owner st.st_uid), the process is not an orphan process, and control transitions from ownership decision operation 330 to end loop decision 460 (e.g., by executing the return command). If the process user identification does not match the device user identification, the process is an orphan computer process. Control then transitions from ownership decision operation 330 to process orphan operation 340.

After ownership decision operation 330 and during process orphan operation 340, the current process is treated as an orphan computer process as described above with reference to FIG. 3.

While the invention has been described with reference to various embodiments, it will be understood that these embodiments are illustrative and that the scope of the invention is not limited to them. Many variations, modifications, additions, and improvements of the embodiments described are possible.

For example, a computer system may be configured to execute the above described orphan identification module on another computer system. This embodiment is useful in a distributed computing environment. Also, although the C programming language has been used in the above described embodiment, other software and programming languages and techniques may be used in accordance with other embodiments of the invention.

The orphan identification method may be executed by a computer system user or by a computer system configured to execute the method. An orphan identification module may be executed on a computer system configured to execute the module and/or may be executed from a computer-readable storage medium. The orphan identification module and the modules and/or operations thereof may include operations executed by application specific hardware modules, operations executed by software modules and/or includes directly entered commands by a computer system user. The method may be embodied in a machine-readable or computer-readable storage medium for configuring a computer system to execute the method. A computer-readable storage medium can include storage devices such as floppy disks, hard drives, optical disks, semiconductor-based memory units or application specific integrated circuits. Thus, the operations referred to herein may be modules or portions of modules (e.g., software, firmware or hardware modules), and the functionality of the described module(s) may be implemented through operations executed by a system user. Furthermore, it is appreciated that the software module(s) discussed herein may include script, batch or other executable files, or combinations and/or portions of such files. Furthermore, the module(s) discussed herein may be decomposed into submodules to be executed by multiple computer processes.

The software module(s) may be stored on machine-readable or computer-readable storage media such as storage 122 of computer system 120. Exemplary computer-readable storage media include magnetic floppy or hard disks or optical disks such as CD-ROM, CD-R or DVD; tape drives; and/or semiconductor-based memory modules including FLASH memory, EEPROM, EPROM, ROM or RAM. Storage 122 may be permanently, removably or remotely coupled to computer system 120 or any other computer system of system 100. Thus, the software module(s) may be stored within a computer system memory to configure the computer system to perform the functions of the module(s). Other new and various types of computer-readable storage media may be used to store the software module(s) discussed herein.

Computer systems are used to provide general manufacturing monitoring and control. The invention has been described in the context of semiconductor processing system 100. In such a system, each of a plurality of semiconductor manufacturing computer systems provides information, control and/or automation to semiconductor manufacturing tools, systems and/or users in a semiconductor manufacturing facility. Thus, in one embodiment, orphan computer processes are identified in a computer network which provides information, control and automation to semiconductor manufacturing processes. Other embodiments include other types of distributed computing systems. The distributed computing system need not be a manufacturing control system. Any distributed computing system is especially benefited by an orphan process identification and handling method and/or module(s).

Other embodiments of the invention may include an information processing network having any number of computer systems in any appropriate network configuration. Furthermore, the functionality of the various computer systems may differ from the computer systems of the above described exemplary distributed computer system. A distributed computing system may include additional computer systems of different types or combinations, or the functions of several of the servers may be combined into fewer servers or a single server. In one embodiment, semiconductor processing system 100 includes as many as ten compute servers 130 coupled to network 105, and as many as thirty terminals 360 are coupled to each of the compute servers 130 via network 105. In this embodiment, semiconductor processing system 100 can support over 1000 work sessions initiated, for example, by users of terminals 260 and executed on compute servers 130 to control and provide information regarding the operation of fab tools 350.

Additionally, those skilled in the art will recognize that the boundaries between modules are merely illustrative and alternative embodiments may merge modules or impose an alternative decomposition of functionality of modules. Moreover, alternative embodiments may include multiple instances of a particular module.

Furthermore, those skilled in the art will recognize that the operations given in the exemplary embodiment are for illustration only. Operations may be combined or the functionality of the operations may be distributed in additional operations in accordance with the invention.

Also, in one embodiment, orphan status indications are checked in succession for a first active process before checking the indications with regard to a subsequent active process. In another embodiment, each process is checked in succession for a first orphan status indication before checking the processes with regard to a subsequent indication.

The above description is not intended to present an exhaustive list of embodiments of the invention. Although an attempt has been made to outline some exemplary variations, other variations are within the scope of invention as defined in the claims below.

APPENDIX A

/* $Header: pstat.h,v 1.12.98.10 96/03/11 19:29:05 cmather Exp $ */
ifndef _SYS_PSTAT_INCLUDED
define _SYS_PSTAT_INCLUDED
ifdef _KERNEL_BUILD
include ". . /h/stdsyms.h"
include ". . /h/types.h"
else /* !_KERNEL_BUILD */

-continued

APPENDIX A

```
#include <sys/stdsyms.h>
#include <sys/types.h>
#endif/* _KERNEL_BUILD */
#ifdef _INCLUDE_HPUX_SOURCE
/*
 * Header organization
 *
 * Structures for old interface
 *       old sub structures
 *       old structures
 *       old related constants
 * Structures for new interface
 *       new sub structures,
 *       new structures
 *       new related constants
 * PSTAT_XXX sub-function constants
 * ANSI function prototypes for the new interface
 *       pstun union
 * ANSI function prototypes for the old interface
 */
/*
 * function codes to the pstat( ) system call
 */
#define PSTAT_PROC       1
#define PSTAT_STATIC2
#define PSTAT_DYNAMIC    3
#define PSTAT_SETCMD     4
#define PSTAT_VMINFO5
#define PSTAT_DISKINFO   6
#define PSTAT_SEMINFO    7
#define PSTAT_MSGINFO    8
#define PSTAT_SHMINFO    9
#define PSTAT_PROCESSOR  10
#define PSTAT_LVINFO   11
#define PSTAT_SWAPINFO   12
#define PSTAT_FILEINFO   13
#define PSTAT_IPCINFO 14
#define PSTAT_PROC_VM  15
#define PSTAT_STABLE   16
/*
 * lengths for cached command line and u_comm entries
 */
#define PST_CLEN 64
#define PST_UCOMMLEN (14 + 1)
/*
 * q4 template for looking at command strings
 */
typedef struct pst_cmd {
    char s[PST_CLEN];
} pst_cmd_t;
/*
 * q4 template for looking at command names
 */
typedef struct pst_ucomm {
    char s[PST_UCOMMLEN];
} pst_ucomm_t;
/* Max number of cpu states
 * that we can return info about.
 */
#define PST_MAX_CPUSTATES 15
/* Max number of processors in
 * system. Used to define sizes
 * of per-processor structures.
 */
#define PST_MAX_PROCS 32
/* Max bytes in a PA-RISC stable store area.
 */
#define PST_MAX_PA_RISC_STABLE 256
/*
 * An abstraction of major/minor numbers of a dev
 */
struct psdev {
    long psd_major;
    long psd_minor;
};
/*
 * An abstraction of a unique identification for a file system
```

-continued

APPENDIX A

```
*/
struct psfsid {
      long psfs_id;           /* Filesystem ID */
      long psfs_type;         /* Filesystem type */
};
/*
* An abstraction of a unique identification for a file
*/
struct psfileid {
      struct psfsid    psf_fsid;      /* Filesystem identification */
      long             psf_fileid;    /* File identification within FS */
      long             psf_spare;     /* Reserved for future expansion */
};
/*
* An abstraction of co-processor information for a processor
*/
struct pscoproc {
      unsigned long   psc_present;   /* mask of coprocessors present */
      unsigned long   psc_enabled;   /* mask of coprocessors enabled */
};
/*
* Coprocessor IDs. The corresponding bit will be set in the fields of
* a struct pscoproc for a present or enabled co-processor.
*/
#define PS_PA83_FPU    0x1
#define PS_PA89_FPU    0x2
/*
* An abstraction of a time
*/
struct psttime {
      long pst_sec;            /* seconds */
      long pst_usec;           /* micro seconds */
};
/*
* An abstraction of a 64 bit cycle count
*/
struct pstcycles {
      unsigned long psc_hi;    /* most significant bits */
      unsigned long psc_lo;    /* least significant bits */
};
/*
* This structure contains per-process information
*/
struct pst_status {
      long pst_idx;            /* Index for further pstat( ) requests */
      long pst_uid;            /* Real UID */
      long pst_pid;            /* Process ID */
      long pst_ppid;           /* Parent process ID */
      long pst_dsize;          /* # real pages used for data */
      long pst_tsize;          /* # real pages used for text */
      long pst_ssize;          /* # real pages used for stack */
      long pst_nice;           /* Nice value */
      struct psdev
            pst_term;          /* TTY of this process; -1/-1 if there isn't one */
      long pst_pgrp;           /* Process group of this process */
      long pst_pri;            /* priority of process */
      long pst_addr;           /* address of process (in memory) */
      long pst_cpu;            /* processor utilization for scheduling */
      long pst_utime;          /* user time spent executing (in seconds) */
      long pst_stime;          /* system time spent executing (in seconds) */
      long pst_start;          /* time process started (seconds since epoch) */
      long pst_flag;           /* flags associated with process */
      long pst_stat;           /* Current status */
      long pst_wchan;          /* If state PS_SLEEP, value sleeping on */
      long pst_procnum;        /* processor this proc last run on */
      char
            pst_cmd[PST_CLEN]; /* Command line for the process, if available */
      long pst_time;           /* resident time for scheduling */
      long pst_cpticks;        /* ticks of cpu time */
      long pst_cptickstotal;   /* total ticks for life of process */
      long pst_fss;            /* fair share scheduler group id */
      float pst_pctcpu;        /* %cpu for this process during p_time */
      long pst_rssize;         /* resident set size for process (private pages) */
      long pst_suid;           /* saved UID */
      char
            pst_ucomm[PST_UCOMMLEN]; /* executable basename the process is running */
      long pst_shmsize;        /* # real pages used for shared memory */
```

APPENDIX A

```
        long pst_mmsize;                    /* # real pages used for memory mapped files */
        long pst_usize;                     /* # real pages used for U-Area & K-Stack */
        long pst_iosize;                    /* # real pages used for I/O device mapping */
        long pst_vtsize;                    /* # virtual pages used for text */
        long pst_vdsize;                    /* # virtual pages used for data */
        long pst_vssize;                    /* # virtual pages used for stack */
        long pst_vshmsize;                  /* # virtual pages used for shared memory */
        long pst_vmmsize;                   /* # virtual pages used for mem-mapped files */
        long pst_vusize;                    /* # virtual pages used for U-Area & K-Stack */
        long pst_viosize;                   /* # virtual pages used for I/O dev mapping */
        unsigned long pst_minorfaults;      /* # page reclaims for the process */
        unsigned long pst_majorfaults;      /* # page faults needing disk access */
        unsigned long pst_nswap;            /* # of swaps for the process */
        unsigned long pst_nsignals;         /* # signals received by the process */
        unsigned long pst_msgrcv;           /* # socket msgs received by the proc*/
        unsigned long pst_msgsnd;           /* # of socket msgs sent by the proc */
        long pst_maxrss;                    /* highwater mark for proc resident set size */
        long pst_sid;                       /* session ID */
        long pst_schedpolicy;               /* scheduling policy for the process */
        long pst_ticksleft;                 /* clock ticks left in process' RR timeslice */
        struct psfileid
                pst_rdir;                   /* File ID of the process' root directory */
        struct psfileid
                pst_cdir;                   /* File ID of the process' current directory */
        struct psfileid
                pst_text;                   /* File ID of the process' executable */
        long pst_highestfd;                 /* highest file descriptor currently opened */
        long pst_euid;                      /* Effective UID */
        long pst_egid;                      /* Effective GID */
        long pst_ioch;                      /* # of characters read/written */
        struct pstcycles
                pst_usercycles;             /* 64-bit user mode execution cycle count */
        struct pstcycles
                pst_systemcycles;           /* 64-bit system mode execution cycle count */
        struct pstcycles
                pst_interruptcycles;        /* 64-bit interrupt for proc cycle count */
        long pst_gid;                       /* Real GID */
        long pst_lwpid;                     /* .LWP identifier. NOTE: If this process is
                                             * multi-threaded, this is an lwpid of one of the
                                             * LWPs in the process at this exact moment, which
                                             * LWP is undefined (random)
                                             */
};
#define pst_major       pst_term.psd_major
#define pst_minor       pst_term.psd_minor
/*
 * Process states for pst_stat
 */
#define PS_SLEEP        1        /* Sleeping on pst_wchan value */
#define PS_RUN          2        /* Running/waiting for CPU */
#define PS_STOP         3        /* Stopped for ptrace( ) */
#define PS_ZOMBIE       4        /* Dead, waiting for parent to wait( ) */
#define PS_IDLE         6        /* Being created */
#define PS_OTHER        5        /* Misc. state (forking, exiting, etc.) */
/*
 * Process flag bits for pst_flag
 */
#define PS_INCORE           0x1     /* this process is in memory */
#define PS_SYS              0x2     /* this process is a system process */
#define PS_LOCKED           0x4     /* this process is locked in memory */
#define PS_TRACE            0x8     /* this process is being traced */
#define PS_TRACE2           0x10    /* this traced process has been waited for */
#define PS_TXTLOCKED        0x20    /* this process' text is locked in memory*/
#define PS_DATLOCKED        0x40    /* this process' data is locked in memory*/
#define PS_SYSCALLTRACE     0x80    /* per-process syscall tracing enabled */
/*
 * Scheduling policies for pst_schedpolicy
 */
#define PS_TIMESHARE    0x1              /* HP-UX scheduling (Tshare/FSS) */
#define PS_RTPRIO       0x2              /* HP-UX rtprio(2) scheduling */
#define PS_FIFO         0x4              /* P1003.4 FIFO scheduling */
#define PS_RR           0x8              /* P1003.4 Round Robin scheduling */
#define PS_RR2          0x10             /* Round Robin with variable timeslice */
#define PS_HPUX         PS_TIMESHARE     /* A.K.A. */
/*
 * This structure contains static system information -- data that will
 * remain the same (at least) until reboot
```

-continued

APPENDIX A

```
*/
struct pst_static {
        long            max_proc;
        struct psdev    console_device;
        long            boot_time;
        long            physical_memory;
        long            page_size;
        long            cpu_states;
        long            pst_status_size;
        long            pst_static_size;
        long            pst_dynamic_size;
        long            pst_vminfo_size;
        long            command_length;
        long            pst_processor_size;
        long            pst_diskinfo_size;
        long            pst_lvinfo_size;
        long            pst_swapinfo_size;
        long            pst_maxmem;
        long            pst_lotsfree;
        long            pst_desfree;
        long            pst_minfree;
        long            pst_max_ninode;
        long            pst_max_nfile;
        long            pst_stable_size;
};
/*
 * This structure contains dynamic system variables, ones which may
 * change frequently during normal operation of the kernel.
 */
Struct pst_dynamic {
        long            psd_proc_cnt;           /* MP: number of active processors */
        long            psd_max_proc_cnt;       /* MP: max active processors */
        long            psd_last_pid;           /* last run process ID */
        long            psd_rq;                 /* run queue length */
        long            psd_dw;                 /* jobs in disk wait */
        long            psd_pw;                 /* jobs in page wait */
        long            psd_sl;                 /* jobs sleeping in core */
        long            psd_sw;                 /* swapped out runnable jobs */
        long            psd_vm;                 /* total virtual memory */
        long            psd_avm;                    /* active virtual memory */
        long            psd_rm;                 /* total real memory */
        long            psd_arm;                    /* active real memory */
        long            psd_vmtxt;              /* virt mem text */
        long            psd_avmtxt;             /* active virt mem text */
        long            psd_rmtxt;              /* real mem text */
        long            psd_armtxt;             /* active real mem text */
        long            psd_free;               /* free memory pages */
        double          psd_avg_1_min;          /* global run queue lengths */
        double          psd_avg_5_min;
        double          psd_avg_15_min;
                                                /* global cpu time/state */
        long            psd_cpu_time[PST_MAX_CPUSTATES];
                                                /* per-processor run queue lengths */
        double          psd_mp_avg_1_min[PST_MAX_PROCS];
        double          psd_mp_avg_5_min[PST_MAX_PROCS];
        double          psd_mp_avg_15_min[PST_MAX_PROCS];
                                                /* per-processor cpu time/state */
        long            psd_mp_cpu_time[PST_MAX_PROCS]
                        [PST_MAX_CPUSTATES];
        long            psd_openlv;             /* # of open Logical Volumes */
        long            psd_openvg;             /* # of open LV Volume groups */
        long            psd_allocpbuf;          /* # of allocated LV pvol buffers */
        long            psd_usedpbuf;           /* # of LV pvol buffers in used */
        long            psd_maxpbuf;            /* max # of LV pvol buffers avail. */
        long            psd_activeprocs;        /* # of active proc table entries */
        long            psd_activeinodes;       /* # of active inode table entries */
        long            psd_activefiles;        /* # of active file table entries */
        long            psd_mpdcnt;             /* # of (bad) memory pages deallocated */
        long            psd_procovf;            /* # of times the proc table overflowed */
        long            psd_inodeovt;           /* # of times the inode table overflowed */
        long            psd_fileovf;            /* # of times the file table overflowed */
        long            psd_global_virtual;     /* Available global virt space (pages) */
};
/*
 * This structure contains VM-related system variables
 */
struct pst_vminfo {
```

-continued

APPENDIX A

```
    long            psv_rdfree;           /* rate: pages freed by daemon */
    long            psv_rintr;            /* device interrupts */
    long            psv_rpgpin;           /* pages paged in */
    long            psv_rpgpout;          /* pages paged out */
    long            psv_rpgrec;           /* total page reclaims */
    long            psv_rpgtlb;           /* tlb flushes - 800 only */
    long            psv_rscan;            /* scans in pageout daemon */
    long            psv_rswtch;           /* context switches */
    long            psv_rsyscall;         /* calls to syscall( ) */
    long            psv_rxifrec;          /* found in freelist rather than in filesys */
    long            psv_rxsfrec;          /* found in freelist rather than on swapdev */
    long            psv_cfree;            /* cnt:      free memory pages */
    long            psv_sswpin;           /* sum:      swapins */
    long            psv_sswpout;          /* swapouts */
    long            psv_sdfree;           /* pages freed by daemon */
    long            psv_sexfod;           /* pages filled on demand from executables */
    long            psv_sfaults;          /* total faults taken */
    long            psv_sintr;            /* device interrupts */
    long            psv_sintrans;         /* intransit blocking page faults */
    long            psv_snexfod;          /* number of exfod's created */
    long            psv_snzfod;           /* number of zero filled on demand */
    long            psv_spgfrec;          /* page reclaims from free list */
    long            psv_spgin;            /* pageins */
    long            psv_spgout;           /* pageouts */
    long            psv_spgpgin;          /* pages paged in */
    long            psv_spgpgout;         /* pages paged out */
    long            psv_spswpin;          /* pages swapped in */
    long            psv_spswpout;         /* pages swapped out */
    long            psv_srev;             /* revolutions of the hand */
    long            psv_sseqfree;         /* pages taken from sequential programs */
    long            psv_sswtch;           /* context switches */
    long            psv_ssyscall;         /* calls to syscall( ) */
    long            psv_strap;            /* calls to trap */
    long            psv_sxifrec;          /* found in free list rather than in filesys */
    long            psv_sxsfrec;          /* found on free list rather than on swapdev*/
    long            psv_szfod;            /* pages zero filled on demand */
    long            psv_sscan;            /* scans in pageout daemon */
    long            psv_spgrec;           /* total page reclaims */
    long            psv_deficit;          /* estimate of needs of new swapped-in procs */
    long            psv_tknin;            /* number of characters read from ttys */
    long            psv_tknout;           /* number of characters written to ttys */
    long            psv_cntfork;          /* number of forks */
    long            psv_sizfork;          /* number of pages forked */
    unsigned long   psv_lreads;           /* number of disk blk reads issued */
    unsigned long   psv_lwrites;          /* number of disk blk writes issued */
    unsigned long   psv_swpocc;           /* # of times swrq occ'd since boot */
    unsigned long   psv_swpque;           /* cumulative len of swrq since boot */
    long            psv_paging_thold;     /* paging threshold, moves between
                                             pst_desfree & pst_lotsfree */
    long            psv_sysmem;           /* pages of memory unavailable for
                                             in-memory backing store */
    long            psv_swapspc_cnt;      /* pages of on-disk backing store */
    long            psv_swapspc_max;      /* max pages of on-disk backing store */
    long            psv_swapmem_cnt;      /* pages of in-memory backing store */
    long            psv_swapmem_max;      /* max pages of in-memory backing store */
    long            psv_swapper_mem;      /* pages of backing store management
                                             overhead:-
                                             psv_swapper_mem + malloc space
                                             = psv_swapmem_cnt */
long            psv_lreadsize;       /* # of char xfer'd by bread */
    long            psv_lwritesize;       /* # of char xfer'd by bwrite */
    long            psv_swapmem_on; /* in-memory backing store enabled */
};
/*
 * Flag bits for pst_vm_status.pst_flags.
 */
#define PS_MEMORY_LOCKED     0x1
#define PS_EXECUTABLE        0x2
#define PS_SHARED            0x4     /* Shared object. */
#define PS_SHARED_LIBRARY    0x8     /* Shared library. */
/*
 * Type values for pst_vm_status.pst_type.
 */
#define PS_NOTUSED           0
#define PS_USER_AREA         1
#define PS_TEXT              2
#define PS_DATA              3
```

-continued

APPENDIX A

```
#define PS_STACK              4
#define PS_SHARED_MEMORY      5
#define PS_NULLDEREF          6
#define PS_IO                 7
#define PS_MMF                8
#define PS_GRAPHICS           9
#define PS_PROT_READ          0x1
#define PS_PROT_WRITE         0x2
#define PS_PROT_EXECUTE       0x4
/*
 * Contains process address space information. See pstat_proc_vm( ).
 */
struct pst_vm_status {
    long pst_space;
    long pst_vaddr64bit_pad;
    long pst_vaddr;
    long pst_length;
    long pst_phys_pages;
    long pst_flags;
    long pst_type;
    long pst_permission;
    struct psfileid pst_id;
};
/*
 * An abstraction of a driver name
 */
#define PS_DRV_NAM_MAX        32
struct psdrvnam {
    char psd_name[PS_DRV_NAM_MAX];     /* driver name */
};
/*
 * An abstraction of a hardware path
 */
#define PS_MAX_HW_ELEMS       32
struct pshwpath {
    long psh_first_index;
    long psh_last_index;
    char psd_name[PS_MAX_HW_ELEMS]; /* hardware path */
};
#define PS_DK_CYL_SIZE        80
struct pst_diskinfo
```

What is claimed is:

1. A method of minimizing waste of information processing resources by orphan computer processes in an information processing system, the method comprising:
classifying each active computer process on a computer system into one of an orphan category comprising orphan computer processes and a legitimate category comprising legitimate computer processes, wherein
an active computer process is classified in the orphan category when the active computer process has a process owner that does not correspond to a device owner of a terminal device corresponding to the active computer process; and
the active computer process is classified in the legitimate category when the process owner corresponds to the device owner; and
processing each active computer process classified in the orphan category according to an orphan processing protocol.

2. The method of claim 1 wherein
the assembled information includes a list of all active computer processes; and
the classifying each of the active computer processes further includes
removing from the list each computer process that is of a type that cannot be in the orphan category; and
removing from the list each computer process in the legitimate category; and
the processing the orphan computer processes corresponds to processing the list after the removing each computer process of the type and the removing each computer process in the legitimate category.

3. The method of claim 2 wherein the removing from the list each computer process that is of a type that cannot be in the orphan category comprises:
removing UNIX daemon processes from the list;
removing system processes from the list; and
removing server processes from the list.

4. The method of claim 2 wherein the classifying each of the active computer processes further comprises:
removing from the list each one of the active computer processes that has no corresponding terminal device.

5. The method of claim 2 wherein the removing from the list each computer process that is of a type that cannot be in the orphan category comprises:
removing from the list each one of the active computer processes that has a process identifier within a first range of values; and
removing from the list each one of the active computer processes that has a process identifier that is one of a list of process identifiers indicating that the corresponding computer process cannot be an orphan computer process.

6. The method of claim 5 wherein the first range of values excludes values greater than 10.

7. The method of claim 5 wherein
the list of process identifiers that cannot be in the orphan category includes process identifiers for at least one of the following processes:
an NFS server process;
a UNIX swap daemon process; and
an NIS client daemon process.

8. The method of claim 5 wherein the list of process identifiers that cannot be in the orphan category includes process identifiers for at least one of the following processes:
a database process; and
a semiconductor processing work session process.

9. The method of claim 2 wherein the removing from the list each computer process that is of a type that cannot be in the orphan category comprises:
removing from the list each one of the active computer processes that has a process command indicating that the corresponding computer process cannot be an orphan computer process.

10. The method of claim 9 wherein a process command "sqlexec" indicates that the corresponding computer process cannot be an orphan computer process.

11. The method of claim 1 wherein the assembling information comprises:
determining a number of the active computer processes;
allocating memory sufficient to store identification information corresponding to each of the active computer processes;
retrieving the identification information corresponding to each of the computer processes; and
storing the identification information corresponding to each of the computer processes in the allocated memory.

12. The method of claim 11 wherein the identification information comprises:
process owner identification information corresponding to each computer process; and
device owner identification information corresponding to each computer process.

13. The method of claim 12 wherein the classifying each of the active computer processes comprises:
deleting from the allocated memory the identification information corresponding to each of the computer processes which are processes that are members of a plurality of classes of processes that cannot be orphan computer processes;
comparing the process and device owner identification information; and
deleting from the allocated memory the identification information corresponding to each of the computer processes for which the process owner identification information corresponds to the device identification owner information; and
the processing the orphan computer processes is performed for all computer processes for which identification information is stored in the allocated memory.

14. The method of claim 13 wherein the plurality of classes of processes that cannot be orphan computer processes comprises:
a system process class;
a server process class; and
a UNIX daemon process class.

15. The method of claim 14 wherein
the system process class includes active computer processes that have a process identifier of less than 10;
the server process class includes active computer processes that have a process identifier indicating that the process is one of a group consisting of the following:
an NFS server process;
a UNIX swap daemon process; and
an NIS client daemon process; and
the UNIX daemon process class includes active computer processes that have no corresponding terminal device.

16. The method of claim 14 wherein the plurality of classes of processes that cannot be orphan computer processes further comprises:
a process command class, the process command class including active computer processes that have a process command indicating that the corresponding computer process cannot be an orphan computer process.

17. The method of claim 1 wherein the predefined orphan processing protocol comprises terminating all computer processes classified as orphan computer processes.

18. The method of claim 1 wherein the predefined orphan processing protocol comprises printing a list of all computer processes classified as orphan computer processes.

19. The method of claim 1 wherein the predefined orphan processing protocol comprises saving a list of all computer processes classified as orphan computer processes.

20. A method of orphan computer process identification, the method comprising:
generating process identification information regarding each of a plurality of computer processes operating on an information processing system; and
classifying each computer process of the computer processes into one of an orphan category comprising orphan computer processes and a legitimate category comprising legitimate computer processes, wherein
a computer process is classified in the orphan category when the computer process has a process owner that does not correspond to a device owner of a terminal device corresponding to the computer process; and
the computer process is classified in the legitimate category when the process owner corresponds to the device owner.

21. The method of claim 20 further comprising:
terminating each computer process in the orphan category.

22. The method of claim 20 further comprising:
outputting information identifying each computer process in the orphan category.

23. The method of claim 20 wherein the generating the process identification information comprises:
determining a number of computer processes running on a computer system;
allocating memory to contain information about each of the number of computer processes running on the computer system;
retrieving process ownership information and device ownership information corresponding to each of the number of computer processes running on the computer system; and
storing the process ownership information and the device ownership information in the allocated memory.

24. The method of claim 20 wherein the determining further comprises:
determining from the process identification information that a computer process is not in the orphan category when the process identification information indicates that the computer process is owned by a current user.

25. The method of claim 24 wherein the determining further comprises:

determining from the process identification information that a computer process of the computer processes is not in the orphan category when the computer process is a member of a class of computer processes that cannot be orphan computer processes.

26. The method of claim 25 wherein the class of computer processes that cannot be orphan computer processes comprises:

system processes;

server processes; and

UNIX daemon processes.

27. The method of claim 24 further comprising:

terminating each computer process in the orphan category.

28. The method of claim 24 further comprising:

terminating each computer process in the orphan category.

29. An apparatus comprising:

a computer-readable storage medium;

an orphan identification module stored on the computer-readable storage medium, the orphan identification module identifying orphan computer processes running on a target computer system responsive to being executed on a computer system, wherein the orphan identification module identifies a computer process as an orphan computer process when an owner of the computer process does not correspond to a device owner for a device corresponding to the computer process.

30. The apparatus of claim 29 further comprising:

a search module for generating a list of computer processes operating on the computer system;

an information retrieval module for retrieving information regarding each of the computer processes on the list; and a removal module for removing from the list of computer processes any computer processes that are members of a class of computer processes that can not be orphan computer processes.

31. The apparatus of claim 30 wherein the removal module is for removing system computer processes and computer processes with active user-owners.

32. The apparatus of claim 30 further comprising:

an output module for outputting information identifying the computer processes on the list after execution of the removal module, the computer processes on the list after execution of the removal module being potential orphan computer processes.

33. The apparatus of claim 30 wherein the information retrieval module comprises:

a module for determining a number of computer processes running on the computer system;

a module for allocating memory to contain information about each of the number of computer processes running on the computer system; and a module for retrieving information regarding ownership of terminal devices corresponding to the computer processes.

34. The apparatus of claim 29 further comprising:

the computer system, the computer system including the computer-readable storage medium.

35. The apparatus of claim 34 further comprising:

a distributed computing system, the distributed computing system including a plurality of computer systems, the plurality of computer systems including the computer system, the active computer processes running on at least one of the plurality of computer systems.

36. The apparatus of claim 35 wherein the information processing system is a semiconductor processing system; and the plurality of computer systems includes a network;

a file server coupled to the network;

a database server coupled to the network;

at least one compute server coupled to the network;

at least one equipment interface server coupled to the network;.

at least one fab tool coupled to at least one of the at least one equipment interface server; and at least one user terminal coupled to the network.

\* \* \* \* \*